United States Patent

[11] 3,601,442

[72] Inventor Roy L. Orndorff, Jr.
Kent, Ohio
[21] Appl. No. 5,594
[22] Filed Jan. 26, 1970
[45] Patented Aug. 24, 1971
[73] Assignee The B. F. Goodrich Company
New York, N.Y.

[54] GRIPPING DEVICE
7 Claims, 6 Drawing Figs.
[52] U.S. Cl. ........................................................ 294/99,
3/1.2, 92/91, 92/92
[51] Int. Cl. .................................................... B25b 11/00,
B66c 1/42
[50] Field of Search ........................................... 294/86.15,
88, 99; 3/1.2; 92/91, 92

[56] References Cited
UNITED STATES PATENTS
3,343,864 9/1967 Baer .............................. 294/99
3,481,254 12/1969 Wetherbee .................... 92/92

Primary Examiner—Evon C. Blunk
Assistant Examiner—I. Kenneth Silverman
Attorneys—W. A. Shira, Jr. and Harold S. Meyer ABSTRACT: A gripping device having a plurality of closed end "fingers" of elastic tubing extending from a common pressure manifold, each finger having a portion of the transverse wall section provided with longitudinal cords of tension resistant material embedded therein along only one side of the tubing. In the relaxed state, the fingers are substantially linear, but upon introduction of a pressurized fluid therein, the fingers curl toward a common central region for gripping. Upon release of the pressurized fluid, the elastomeric fingers of the device return to substantially a linear state releasing the grip.

PATENTED AUG 24 1971
3,601,442
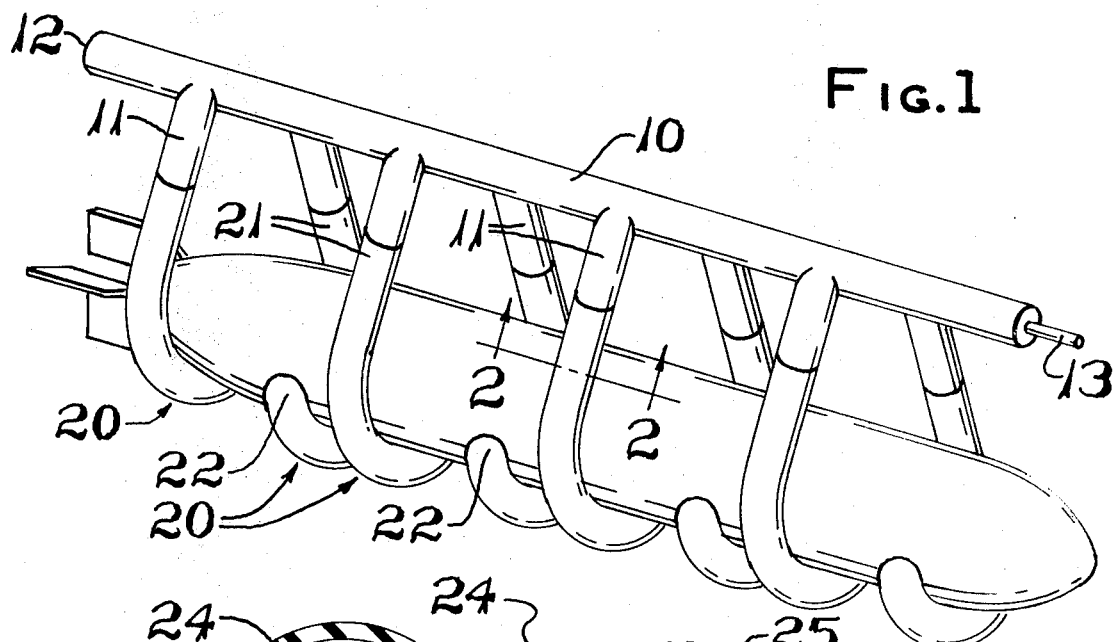
Fig. 1
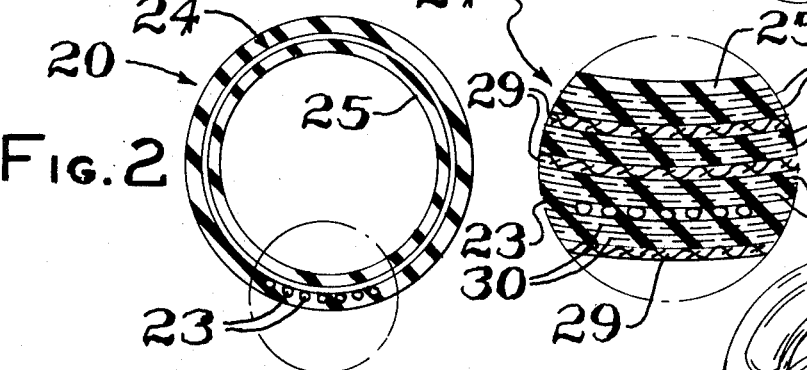
Fig. 2  Fig. 2a
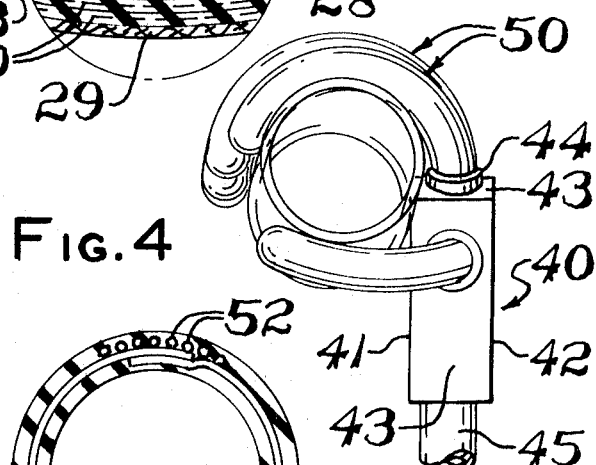
Fig. 4
Fig. 5
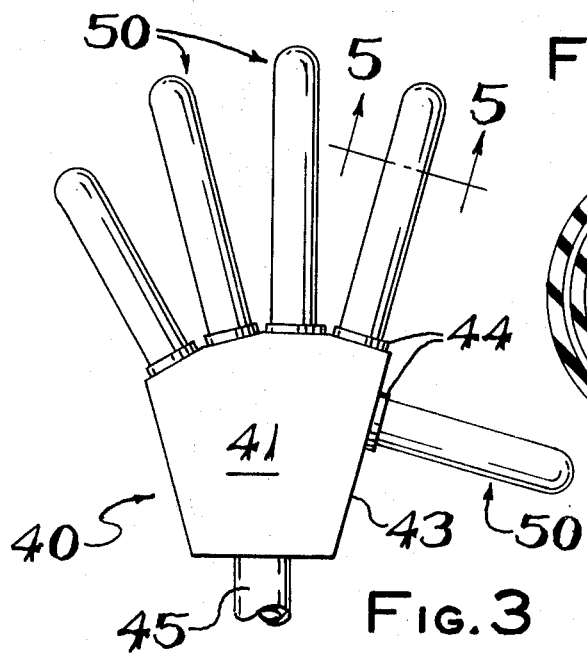
Fig. 3
INVENTOR.
Roy L. Orndorff, Jr.
BY
W. A. Shira, Jr.
ATTY.

GRIPPING DEVICE

BACKGROUND OF THE INVENTION

Fluid mechanical actuators of the piston-cylinder type are commonly used for providing movement through limited distances and also to provide a means for gripping objects too difficult or hazardous to be handled manually. Examples of such devices are to be found in equipment for handling materials at elevated temperatures, at cryogenic temperatures and where high levels of radioactivity preclude a human operator from close proximity to the material being handled. Such actuators are also used to provide force assistance for moving linkage members and other components of machines and manipulative devices.

One area of possible use for such devices is that of providing a means of grasping large or irregularly shaped articles which must be handled with care and cannot withstand severe local stresses caused by concentrated forces exerted by rigid mechanical clamping and gripping devices. It is often desirable to pattern such gripping devices after the form of the human hand. Various mechanical expedients have been devised to provide a device having the versatility of the human hand; however, these expedients have been extraordinarily complex, unwieldy and difficult to maintain in proper working order in view of the mechanical complexity. Typically, previous devices have utilized rigid arms and pinned linkages to provide translatory motion and rotational movement about pivot pins. Furthermore, where accurate and repetitive multidirectional movement is required of the mechanism, the components must be intricately designed and individual components must be made with a high degree of precision, thereby making the device quite costly.

It has been proposed to provide a device as set forth in the teachings of Baer, U.S. Pat. No. 3,343,864, issued Sept. 26, 1967, wherein individual actuators are constructed with one portion of the transverse periphery corrugated or convoluted to thereby provide additional material in the wall of the actuator to permit curling. However, the proposed construction of Baer, by not having a uniform exterior shape, causes problems in fabrication in order to provide actuators capable of withstanding large magnitude operating pressures.

SUMMARY OF THE INVENTION

This invention relates to a fluid pressure operated actuating device for providing movement through limited distances and exerting the forces necessary for gripping and handling articles. The device is in the form of a plurality of elongated flexible elastic tubes each closed at one end with the remaining end attached to a common rigid pressure manifold with the chamber in each tube communicating with the fluid passage in the manifold. Each of the tubes normally extends linearly with a longitudinally uniform cross section in the unpressurized state, but upon introduction of a pressurized fluid, each of the tubes assumes an arcuate configuration about an axis substantially at right angles to its length. The "curling" to an arcuate configuration is the result of each of the tubes having a portion of its transverse periphery rendered substantially inextensible in the longitudinal direction while the remainder of the periphery is longitudinally but not circumferentially extensible. This is made possible by forming the tube of elastomeric material with substantially inextensible reinforcing cords embedded in the wall of the tube with the cords disposed longitudinally of the tube in a region which does not exceed one-half of the transverse periphery of the tube. Each of the tubes also has substantially inextensible reinforcing cords, preferably radially inwardly of the longitudinal cords, extending at right angles to the length of the tube to prevent transverse expansion of the tube wall. Thus, the layer of longitudinal reinforcing cords along one side of each tube restrains the tube such that upon pressurization, each of the tubes changes from a linear configuration to a curled, or curved, state with the side of each tube having the tension cords therealong forming the radially inner surface of the curvature.

In one embodiment of the invention, the tubes are supported on and connected to a manifold in the form of a rigid linear tube, or pipe, with "fingers," or flexible actuator tubes extending from the manifold pipe in two straight rows with the unpressurized fingers in the two opposite rows having an acute included angle between them. The fingers in each row are spaced longitudinally so that each finger in one row is opposite the space between adjacent fingers of the opposite row. This alternating longitudinal arrangement permits the fingers of each row to curl between the fingers on the opposite row thereby preventing interference between the fingers of opposite rows.

Another embodiment of the invention utilizes a manifold having a configuration of a polygonally shaped block or plate having opposite parallel faces with the edges of the faces formed to give the manifold a polygonal configuration. One of the "fingers" or actuators is attached to a pressure port on each edge surface such that a plurality of fingers extend outwardly in a generally radial pattern from the manifold. The "fingers" or actuators of this embodiment have the inextensible portion of each actuator so disposed that, when pressurized, they curl in a manner analogous to that of human fingers, with the manifold occupying the position of the palm.

The invention has a variety of uses, among which is that of a grappling device for recovery of naval torpedos from the ocean floor for the embodiment having a linear manifold. The embodiment having the radially arranged fingers or actuators, finds utility, for example, as a remotely controlled "hand" for lifting delicate laboratory glassware containing hot or hazardous liquids or as an orthotic or prosthetic device. The resilience of the fingers of the present invention in combination with their ready flexibility lends the present invention to gripping fragile irregularly shaped objects without causing mechanical damage to the object by excessive stresses in regions of contact of irregular surfaces, which has been the problem with previous rigid mechanical gripping devices.

BRIEF DESCRIPTION OF THE DRAWINGS

FIG. 1 is a perspective view of the embodiment of the invention utilizing a straight pipe manifold;

FIG. 2 is a cross sectional view taken along sectional indicating line 2—2 of FIG. 1 and shows the details of wall construction of a typical actuator member;

FIG. 2a is an enlargement of the portion of the actuator wall enclosed in a circle in FIG. 2;

FIG. 3 is a front elevational view of the embodiment of the invention utilizing a polygonally shaped block manifold with the actuator members disposed in a radial pattern from the edges of the manifold;

FIG. 4 is a side view of the embodiment of FIG. 3 showing the actuator members in the pressurized state; and, FIG. 5 is a transverse sectional view of one of the actuators, taken along section indicating line 5—5 of FIG. 3.

DETAILED DESCRIPTION

Referring now to FIG. 1, the embodiment of the invention having a linear manifold 10, preferably a straight section of pipe or tubing, is illustrated in the preferred form wherein the actuators 20 are arranged in two rows extending from the pipe, with each actuator perpendicular to the axis of the pipe and with the actuators in each row lying in a common plane with the two rows spaced angularly from each other by an acute angle. Preferably, the actuators in opposite rows are staggered longitudinally along the pipe such that when the actuators are curled by pressurization, the actuators in one row may curl and pass between the actuators in the opposite row without interference therebetween.

Each of the actuators 20 has one end 21 connected in a fluid pressure sealing manner to a transfer port 11 on the manifold, with the opposite end of the actuator 22 closed to provide a pressure chamber longitudinally in the central region of the actuator tubing. The manifold 10 has one end 12 closed with an inlet port 13 formed in the opposite end. Upon introduction of pressurizing fluid through inlet port 13, fluid pressure is developed in the manifold and through transfer ports 11 in each of the actuators 20. As the pressure increases, the actuators 20 in each row begin to curl toward and intermediate adjacent actuators in the opposite row thereby providing a clamping or gripping action over any object which has been positioned between the rows of actuators. For example, an elongated object such as a torpedo, shown in FIG. 1, would thus be gripped or clamped between the rows of actuators and could thereby be transported while cradled between the curled actuators. For purposes of illustration, each of the actuators is shown in FIG. 1 in the curled configuration and gripping a torpedo therebetween.

Referring now to FIG. 2 and FIG. 2a, the preferred construction of the actuators is shown in detail with the features which provide the mechanism whereby the actuators are caused to curl about one side portion upon introduction of the pressurizing fluid therein. The actuator members 20 are formed of tubing of preferably elastomeric material although any flexible plastic or other suitably elastic material may be used. Preferably, the actuators 20 are formed of tubing having a circular cross section illustrated in FIG. 2; however, the actuators may have a polygonal cross section.

The elastomeric wall of each actuator has embedded therein, in one portion of the wall not exceeding one-half of the circumference thereof, a plurality of longitudinally disposed, spaced, parallel, reinforcing cords 23 of substantially inextensible material. In the preferred practice of the invention, the longitudinal reinforcing cords 23 are formed of stranded metal wire. However, inextensible textile cords or any other suitable inextensible cord material may be used. The cords 23 thus render one portion of the tube 20 longitudinally inextensible thus restraining that portion of the wall against longitudinal extension upon pressurization of the actuator. The other portions of the tube can elongate longitudinally, however, so that the actuator is caused to curl about the side having the longitudinal cords 23 embedded therein.

The actuator 20 also has at least one layer of circumferentially extending reinforcing cords 24 embedded in the wall of the tubing and disposed substantially at right angles to the longitudinal cords 23. When the actuator is designed for handling large objects there are, preferably, multiple superposed layers of cords 24 disposed both radially inwardly and outwardly of the longitudinal reinforcing cords 23. The circumferentially reinforcing cords 24 prevent the elastomeric material from extending in the peripheral direction perpendicular to the axis of the tube upon pressurization. However, the cords 24, being independent of the longitudinal cords 23, do not affect the longitudinal flexibility of the remaining portions of the wall not having longitudinal reinforcing cords therein. Thus, the actuators 20 of the present invention substantially maintain their cross sectional shape during pressurization and curling so as to prevent kinking, buckling, or collapsing of the walls, thereby permitting the actuators to exert a positive and controlled gripping force proportional to the fluid pressure therein.

In the presently preferred form of the invention, a typical 3-inch inside diameter actuator 20 is formed of superposed layers beginning with a fluid-impervious liner layer 25 of elastomeric material and proceeding radially outwardly with the circumferential cords denoted by the general numeral 24 and comprising three pairs of layers, denoted by numerals 26, 27 and 28 in FIG. 2, of circumferential weftless elastomer covered nylon cords, each 0.031 inch in diameter. Preferably, a single layer of square woven nylon fabric 29 is provided intermediate each of the pairs 26, 27 and 28 of elastomer covered nylon cords at the end portion attached to the transfer ports 11 for a length of generally two diameters of the actuator. The strip of longitudinally disposed cords 23 is placed in adjacent superposed relationship radially outward of the previous pair 28 of circumferential cords. Radially outward in adjacent superposed relationship is then provided a terminal pair 30 of layers of circumferentially disposed elastomer covered weftless nylon cords. A cover layer of the square woven fabric 29 is then provided over the terminal pair 30 of weftless circumferential cords extending the full length of the actuator. The assembly is vulcanized to provide an integral union of the components.

It will be understood that the above-described construction is preferred for an actuator tube of the size required for use in the embodiment of FIG. 1; however, other embodiments will obviously require different numbers reinforcing and arrangements of layers of cords. For example, in small actuator tubes less than 1 inch in diameter, it may be desirable to use only a single layer of circumferential cords disposed preferably radially inwardly of the longitudinal cords.

Referring now to FIG. 3, 4 and 5, another embodiment of the invention which is adaptable for use as an orthotic or prosthetic device is shown wherein the gripping actuators are generally less than 1 inch in diameter. The embodiment of FIG. 3 has a manifold 40 formed preferably as a rigid block having two opposite parallel faces 41 and 42 with a plurality of planar edge surfaces 43 such that in the plane of one of the parallel faces, the manifold 40 has a polygonal configuration. Each of the edge surfaces 43 has a transfer port 44 formed therein with each of the ports 44 communicating with a common internal pressure chamber. Each of the ports 44 has one end of an actuator member 50 attached thereto in a fluid pressure sealing manner with the opposite end of each of the actuators 50 being closed so that the central region of the tube forms a fluid pressure tight chamber. Hence, when pressurized fluid is introduced into the manifold inlet 45, it passes through the transfer ports 44 and into the central chamber of each of the actuator members 50.

The actuators 50 are disposed perpendicular to the adjacent edge faces of the manifold such that the actuators extend radially outwardly from the manifold. In the preferred form of the invention, the edge surfaces 43 of the manifold are each formed perpendicularly to the parallel sides of the manifold such that the actuators extend radially outwardly from the center of the manifold in a common plane. However, the manifold may have any designed configuration to provide the pattern needed for a particular gripping application.

The actuator 50 of the embodiment of FIG. 3 uses a simpler wall construction than that of the embodiment of FIG. 1 as illustrated in FIG. 5 in view of the lesser gripping forces required.

Referring now to FIG. 5, the actuator 50 is formed of elastomeric material having a layer of circumferentially disposed reinforcing cords 51 embedded therein, which cords are preferably overlapped or spliced. A strip of longitudinally disposed cords 52 is provided radially outward in preferably superposed relationship with the overlapped region of the circumferential cords 52. However, the strip of longitudinal cords may alternatively be disposed circumferentially spaced closely adjacent the overlapped or spliced region.

The actuators 50 of the embodiment of FIG. 3 are positioned at their point of attachment to the transfer ports 44 such that the longitudinal reinforcing cords embedded in the wall (see cords 52 of FIG. 5) of each actuator 50 are positioned closely adjacent one common face of the manifold for all of the actuators. Thus, upon introduction of a pressurized fluid into the inlet port 45 of the manifold, each of the actuators 50 is caused to curl toward the central region of the manifold on a common side of the manifold in a manner similar to that of the fingers of the human hand. Referring to FIG. 4, the gripping device is shown in the pressurized state with the actuator members 50 in a position so as to grip an object positioned adjacent the central region of the manifold, for example, a glass laboratory beaker as illustrated in FIG. 4.

The present invention thus provides a gripping device which is capable of resiliently grasping and holding irregularly shaped objects with sufficient force to transport the object yet with a degree of resilience necessary to prevent damaging localized gripping stresses which would occur if the object were handled by mechanical grappling devices. The gripping force is provided by the curling of a plurality of elastomeric actuators having longitudinal reinforcing cords embedded in the wall thereof in a limited region of the transverse periphery. Although the embodiments described and claimed herein provide for a single inlet port connected commonly to all fingers, it will be obvious to those having ordinary skill in the art that multiple inlet ports may be provided with each inlet port connected to less than all of the fingers to thereby enable selected, separate, or sequential operation of the actuators.

Modifications and adaptations of the invention may be made by those having ordinary skill in the art, the invention being limited only by the spirit and scope of the appended claims.

1. A gripping device comprising in combination: with said manifold
   a. a rigid pressure manifold having a hollow chamber therein with an inlet port communicating therewith adapted to receive fluid therethrough under pressure, said manifold further having a plurality of spaced transfer ports communicating with said chamber; and
   b. a plurality of actuator members each comprising a hollow tube of elastically extensible material having one end closed and the other end connected to one of said transfer ports on said manifold, with each of said members having a longitudinal region extending transversely less than one-half the transverse periphery thereof provided with at least one layer of longitudinally extending reinforcing cords of substantially inextensible material and each of said members further including at least one layer of circumferentially extending reinforcing cords of substantially inextensible material embedded in the said elastically extensible material, whereby introduction of fluid pressure into said manifold causes each of said actuator members to curl elastically about an axis substantially at right angles to its length and toward a common central region to thereby provide a gripping action.

2. The gripping device defined in claim 1, wherein each of said actuator members has a substantially longitudinally uniform cross section in the unpressurized state.

3. The device as defined in claim 1 wherein
   a. each of said tubes comprises an inner impervious layer of elastomeric material; and,
   b. said layer of circumferentially extending cords comprises a sheet of substantially weftless elastomer covered cord fabric with the warp of said fabric extending circumferentially of the tube.

4. The device as defined in claim 3 further comprising at least one layer of woven fabric disposed in each tube adjacent the end thereof connected to one of said ports.

5. The device defined in claim 1, wherein each of said actuator members includes three pairs of radially superposed layers of said circumferential cords radially inward of said longitudinal cords, with a layer of woven fabric disposed radially intermediate each pair of circumferential cords for a longitudinal distance of substantially two diameters of said actuator at the end thereof attached to said transfer ports and a pair of radially superposed layers of said circumferential cords disposed radially outward of said longitudinal cords.

6. The device as defined in claim 5, wherein said layers of circumferential cords each comprises a sheet of substantially weftless elastomer covered cord fabric with the warp of said fabric extending circumferentially of the tube.

7. The device as defined in claim 5, wherein said longitudinally extending cords are metal.

PO-1050
(5/69)

UNITED STATES PATENT OFFICE
CERTIFICATE OF CORRECTION

Patent No. 3,601,442                         Dated August 24, 1971

Inventor(s)   Roy L. Orndorff, Jr.

It is certified that error appears in the above-identified patent and that said Letters Patent are hereby corrected as shown below:

Column 5, lines 14 and 15, cancel "with said manifold"

Signed and sealed this 18th day of April 1972.

(SEAL)
Attest:

EDWARD M. FLETCHER, JR.                ROBERT GOTTSCHALK
Attesting Officer                      Commissioner of Patents